July 8, 1947.   C. JOBST   2,423,499
WORK HOLDER FOR BRUSH MAKING MACHINES
Filed May 11, 1944
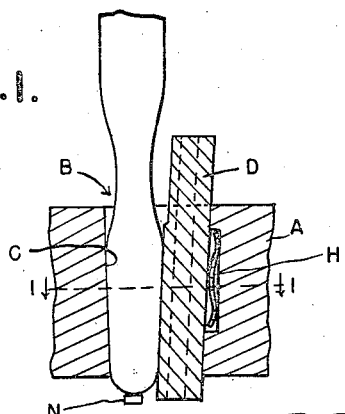
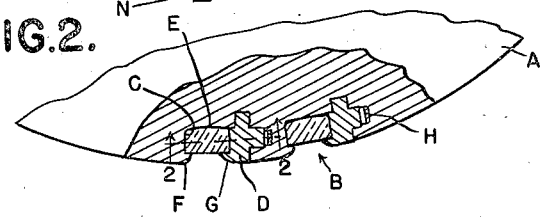
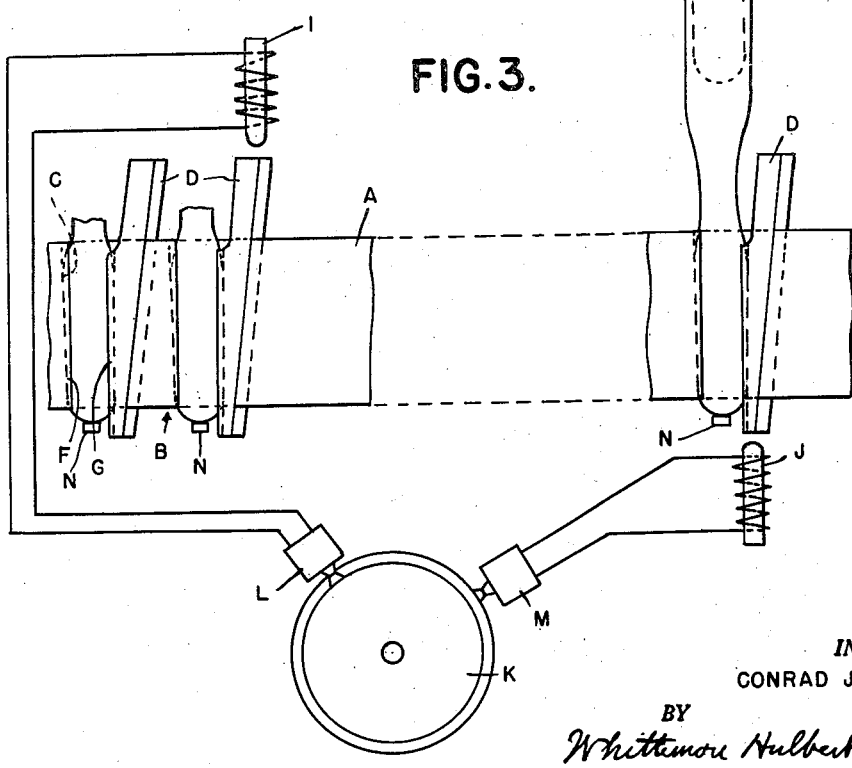
INVENTOR.
CONRAD JOBST
BY
Whittemore Hulbert + Belknap
ATTORNEYS Patented July 8, 1947

2,423,499

UNITED STATES PATENT OFFICE 2,423,499

WORK HOLDER FOR BRUSH MAKING MACHINES

Conrad Jobst, Toledo, Ohio, assignor to The Toledo Automatic Brush Machine Company, Toledo, Ohio, a corporation of Ohio Application May 11, 1944, Serial No. 535,167

5 Claims. (Cl. 300—10)

The invention relates to work holders more particularly designed for use in connection with brush manufacturing machines and of that type in which a series of brush backs are successively presented to the drilling and tufting mechanisms.

In one form of brush machines designed for the manufacture of tooth brushes the work support is in the form of a turret provided with an annular series of work clamps around the periphery thereof. Each of these clamps is adapted to receive a tooth brush handle which in the intermittent rotation of the turret is presented, first, to a drilling mechanism and later to a tufting mechanism. At a further point in its movement the clamp is released for the removal of the completed brush, after which another handle is inserted into the clamp and the cycle is repeated.

Tooth brush handles are formed of various materials and are usually of a shape in which the brush back portion tapers slightly towards its outer end. Where the tuft receiving bores are simultaneously formed in a back by a multiple drilling mechanism, there is a considerable thrust against the brush back so that it is necessary to firmly hold the same in the work clamp and also to provide a solid abutment for resisting the thrust. It is also important that this clamp should not in any way injure the surface of the work.

In view of these conditions I have devised a construction of work holder applied to a turret or other work carrier as hereinafter set forth.

In the drawings:

Fig. 1 is a horizontal section on line 1—1, Fig. 2, through a portion of a work turret illustrating my improved work holder;

Fig. 2 is a vertical section on line 2—2, Fig. 1; and

Fig. 3 is a side elevation of spaced portions of the turret diagrammatically illustrating the means for respectively clamping the work in the work holders and for releasing and disengaging the work therefrom.

A is the work holder preferably in the form of a revoluble turret having arranged around the periphery thereof a series of work clamps B. Each of these clamps is formed by a slot C having one side wall thereof stationary and slightly inclined to correspond to the taper of the brush back. The opposite wall of this slot is formed by a member D slidably engaging a T-shaped lateral extension of the slot C which is inclined correspondingly to the opposite side of the tapering brush back. The construction is such that the downward movement of the member D in the T-slot will contract the width of the slot C and, therefore, will laterally clamp a brush back when engaged with said slot. The rear wall E of the slot C affords support for the rear face of the brush back, being fashioned to a corresponding contour while narrow flanges F and G overlap the front face of the brush back to restrain the same from outward movement.

The clamps just described slightly spaced from each other preferably extend completely around the periphery of the turret and the latter is intermittently rotatively operated by indexing mechanism (not shown) to advance the series step by step. The drilling mechanism and the tuft setting mechanism are arranged at spaced points around the turret so that in each step of advancement a brush back will be registered with each of these mechanisms. The specific construction of the drilling mechanism and of the tufting mechanism forms no part of the instant invention, which latter relates to the work clamps and means for operating the same in the clamping and the release of the work.

The member D by reason of its engagement with the T-shaped slot is held against transverse movement other than that which is the result of its longitudinal movement. It is also preferably provided with friction means for yieldably holding it in any position of adjustment within the slot, such means, as shown, comprising a bowed spring H located in a recess in the member D and resiliently pressing against the adjacent side wall of a slot. The work is manually introduced into the clamps of the holder when the latter are in advance of the position for registration with the drilling mechanism. This need not be necessarily at any one point, but may be any place between the position of release for a finished brush in the position of said drilling mechanism. However, before the drilling operation is performed the brush back must be firmly clamped by the downward movement of the member D. This is preferably accomplished by an electric magnet or solenoid I which is located above the member D in one position of its step by step advancement. When the solenoid is energized it will be moved downward to deliver an impact upon the member D and preferably two successive impacts which will wedge said member against the brush back and firmly clamp the same. The release of the work after completion of the tufting operation is effected by a similar solenoid J arranged beneath the member D in one position of its step by step advancement.

This, when energized, will deliver an upwardly directed impact which not only releases the clamping pressure, but will also by reason of its frictional engagement with the work throw it upward so as to deliver it into a suitable receiver. The timing of the operations of the solenoids I and J is effected by a cam K which is driven by a portion of the mechanism (not shown) for actuating the turret and operates circuit closing switches L and M for the respective circuits of the solenoids I and J.

With the construction described, the work in each holder is backed by a rigid abutment which will receive the stresses incident to the performance of the work and particularly the thrust occasioned by multiple drilling. A stop N limits the downward movement of the brush back in the holder.

What I claim as my invention is:

1. The combination with a work carrier intermittently rotatable about a vertical axis, of a series of work holders surrounding said carrier each including a vertically extending open recess in the peripheral face of the carrier, the inner face of said recess forming a rigid abutment for a brush back opposite the exposed face thereof to be drilled and tufted, a wedge member located at one side of each recess for clamping the brush back therein, friction means for restraining downward movement of said wedge member to permit free insertion of a brush back into said recess through the upper end thereof, a stop for limiting the downward movement of said brush back in said recess, means located at a predetermined point in the intermittent movement of said carrier for automatically depressing said wedge member to clamp the brush back, and means located at another point in the movement of said carrier for automatically raising said wedge to release said brush back.

2. The combination with a work carrier intermittently rotatable about a vertical axis, of a series of work holders surrounding said carrier each including a vertically extending open recess in the peripheral face of the carrier having one side thereof slightly tapered in a downward direction, the rear face of said recess forming a rigid abutment, a wedge member located at the opposite side of said recess adapted to contract the same upon downward movement, said wedge member having a correspondingly tapered inner face, means for frictionally restraining downward movement of said wedge member to permit insertion in said recess through the upper end of a tooth brush handle having a correspondingly tapered portion to be tufted, a stop for limiting the downward movement of said handle, means located respectively at spaced points in the intermittent movement of the carrier between which points the drilling and tufting operation are to be performed, the first of said means being adapted to automatically depress a registering wedge member to clamp the corresponding brush back in its recess and the other of said means being adapted to automatically strike the lower end of a registering wedge member to release the clamp and simultaneously throw the brush back out of said recess.

3. The combination with a work carrier intermittently rotatable about a vertical axis, of a series of work holders surrounding said carrier each including a vertically extending open recess in the peripheral face of the carrier having one side thereof slightly tapered in a downward direction, the rear face of said recess forming a rigid abutment, a wedge member located at the opposite side of said recess adapted to contract the same upon downward movement, said wedge member having a correspondingly tapered inner face, means for frictionally restraining downward movement of said wedge member to permit insertion in said recess through the upper end of a tooth brush handle having a correspondingly tapered portion to be tufted, a stop for limiting the downward movement of said handle, electromagnetic means located respectively at spaced points in the intermittent movement of said carrier between which points the drilling and tufting operations are to be performed, the first of said electromagnetic means being adapted to drive a registering wedge member downward to clamp a brush back in the corresponding recess and the second of said electromagnetic means being adapted to strike the registering wedge member upward thereby releasing the clamp and simultaneously throwing the brush back upward out of said recess.

4. A work holder comprising a member having an open recess formed therein, the inner face of said recess forming a rigid abutment and one side of said recess being tapered in a downward direction, a wedge slidably engaging said member at the opposite side of said recess and having its inner face correspondingly tapered, said tapered faces corresponding to opposite tapering edges of a tooth brush back insertable in said recess through the upper end thereof, friction means for restraining downward movement of said wedge, a stop for limiting downward movement of said tooth brush handle in said recess, and impact means for automatically moving said wedge downward and upward to respectively clamp the brush back and to release the same the upward movement of said wedge also serving to throw the brush out of said recess.

5. A work holder comprising a member having an open recess formed therein, the inner face of said recess forming a rigid abutment, a wedge member located at one side of said recess adapted when moved inward to clamp the work therein, said wedge having a T-head portion slidable in corresponding ways in said member to be held thereby against relative lateral movement in any direction, and retaining flanges on said wedge and on the opposite side of the recess for slightly overlapping the work while exposing the face thereof to be operated upon.

CONRAD JOBST.

REFERENCES CITED

The following references are of record in the file of this patent:

UNITED STATES PATENTS

| Number | Name | Date |
|---|---|---|
| 2,295,326 | Bell et al. | Sept. 8, 1942 |
| 924,194 | Schwartz | June 9, 1909 |
| 1,455,932 | Perkins | May 22, 1923 |